April 5, 1955

R. L. TRIPLETT 2,705,738

CASES FOR ELECTRICAL MEASURING INSTRUMENTS

Filed April 25, 1949

INVENTOR
RAY L. TRIPLETT

By

Toulmin & Toulmin
ATTORNEYS ions in the solder affected by temperature and
vibration, pin holes often develop which allow moisture
United States Patent Office 2,705,738
Patented Apr. 5, 1955

2,705,738

CASES FOR ELECTRICAL MEASURING INSTRUMENTS

Ray L. Triplett, Bluffton, Ohio, assignor to The Triplett Electrical Instrument Company, Bluffton, Ohio, a corporation of Ohio Application April 25, 1949, Serial No. 89,466

2 Claims. (Cl. 174—153)

The present invention relates to electrical instruments and more particularly to devices for sealing the glass window and terminals with respect to the case of the instrument.

Instrument cases which are hermetically sealed against moisture entering the glass windows and terminals usually have an inert gas or dehydrated atmosphere inside to prevent sweating when exposed to temperature changes. The seals must be made to hold against leaks when exposed to extreme changes in temperature—usually —55° to +85° C.—as well as to withstand severe vibration.

It has heretofore been the practice to seal both the glass window and glass terminals by first coating the pre-tempered glass with silver which is fused at a temperature of about 1100° F. to the glass. The silver coating serves as a tinning base permitting the glass to be soldered direct to the metal case. However, due to the very thin coating and changes in the solder affected by temperature and vibration, pin holes often develop which allow moisture to enter the case. The glass and metal must have the same coefficient of expansion to avoid breakage of the glass when temperature changes occur.

The present invention avoids the necessity for silver-tinning the glass and therefore eliminates the possibility of pin holes developing, with the additional advantage of obviating the necessity of having to use glass and metal with the same coefficient of expansion.

The main object of the invention is to provide an improved seal for electrical instruments that will remain hermetically tight and moisture-proof under extreme changes of temperature and humidity.

Another object is to provide an improved combined seal and support for a glass window in an instrument case which can be easily applied without strain on the glass.

Still another object is to provide an improved seal between a glass window or a terminal and the instrument case which will prevent cold flow of the insulating material and thereby remain hermetically tight under all practical conditions of operation.

Another object is to provide a leading-in bushing for an instrument case which will make a hermetic contact between the leading-in conductor and the case, the bushing being adapted to withstand changes of practical intensity of temperature, humidity or pressure within or without the casing.

A further object is to provide an improved seal between the glass window and an instrument case, and also between a leading-in conductor and the case which will withstand any practical degree of vibration that might be applied to the case and still retain its sealing qualities.

A further object is to provide a leading-in bushing for carrying a conductor through a metal plate or the case of an instrument and having such long leakage paths as to present extremely large resistance between the conductor and the plate or case.

Still another object is to provide an improved seal and support between the glass window and an instrument case or between the terminals and the case, as can be applied or spread in a cold state and become flexible when heated to a hardening temperature.

The final object is to provide an electrical measuring instrument adapted to be supported by its terminals and offering sufficient flexibility between the terminals and the casing as to resiliently mount the movement with respect to the casing.

The above objects are carried out in brief by providing flexible gaskets on both sides of the window of the instrument and by additionally providing terminal cups around the leading-in conductors filled with plastic gasket material.

Other objects and features will be apparent as the following specification is perused in connection with the accompanying drawings in which.

Figure 1:
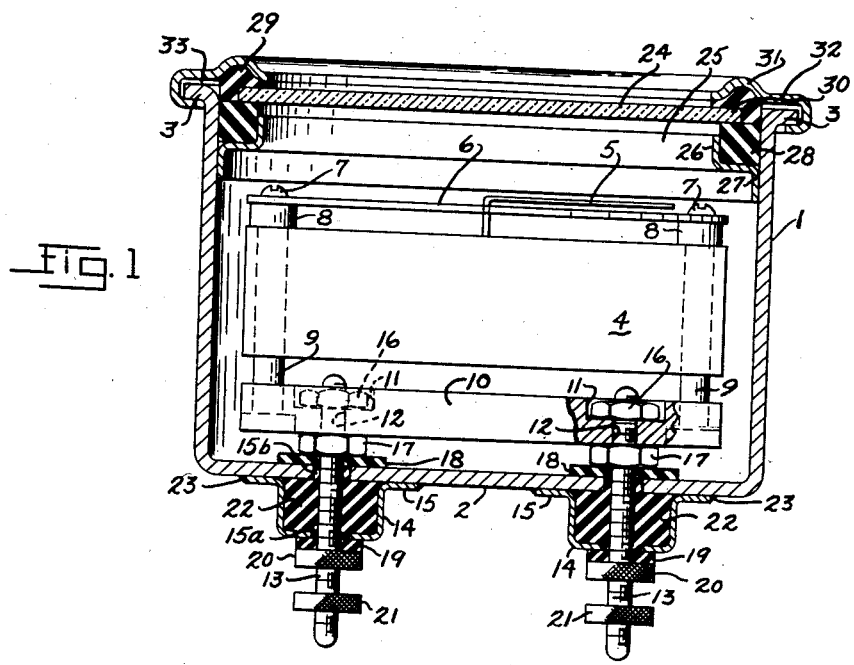
Figure 1 represents a vertical sectional view of the instrument case and showing the sealing devices in position. Certain parts of the instrument movement and the terminals have been shown in elevation for clearness.
Figure 2:
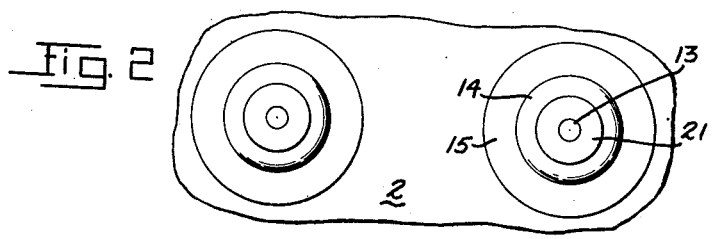
Figure 2 is a fragmentary plan view looking upwardly toward the bottom side of the instrument case to show the configuration of the terminal sealing devices.

Referring to Figure 1, reference character 1 designates a cylindrical member made of any suitable metal such as steel or aluminum, having a base 2 at one end and terminating at the other end in an outwardly extending flange 3. Within this cylindrical case there is an instrument movement 4 (shown in elevation) which may include a typical type of magnet and a rotor which carries a pointer 5. This pointer is adapted to swing over a brass dial 6 of any suitable and well known type, the dial being secured to the magnet member 4 by means of screws 7 and spacers 8. Rods 9 mount the instrument movement 4 above a plate support member 10. The latter is provided with a pair of recessed openings 11 from which extends an aperture 12 passing through the plate. Terminal rods 13, preferably threaded over their entire length, extend through the openings 12, these rods being provided for the purpose of bringing electrical connections from the oscillating rotor and its pointer to the exterior of the case. Wires (not shown) are connected between the terminal rods 13 and the opposite ends of the wound rotor, being carried to the rotor through the usual torsion springs as is well known in the art.

Instruments of the character described are very delicate in nature and their ultra sensitivity can be easily detroyed or impaired by rough handling, by the action of moisture entering around the glass window and terminals, and particularly when the case is subjected to vibration. Minute leaks are apt to form at any of the places where the terminals pass through the metal case or where the glass window is supported with respect to the case.

In accordance with my invention, all of the possibilities of leakage or damage through vibration or other impairment of the efficiency of the contained instrument movement are obviated. In the improved instrument steel cups 14 are provided at the bottom of the case and about each of the terminal rods 13, these cups having a relatively wide flange as indicated at 15 so as to lend themselves to being easily welded to the metal case without causing appreciable heat to be propagated in the direction toward the terminals or studs. The lowermost or flat portion of these steel cups are provided with an opening 15a, somewhat larger than the terminal 13; the opening 15b in the base 2 of the case is also larger than the terminal, as indicated on the drawings.

The terminals or studs 13 are secured to the instrument case by means of a nut 16 contained within the recess 11 and a nut 17 which presses against the underside of the plate 10. There is a washer 18 of hard substance such as rubber, Bakelite, ceramic and similar material positioned between the nut 17 and the inner surface of the base 2, also a washer 19 of corresponding material which sets against the undersurface of the steel cup.

A hexagon or knurled nut 20 presses the washer 19 against the cup, which is pressed inward slightly, thus reducing the space within the inner walls of the steel cup. This reduced space causes the rubbery gasket material 22 to press more tightly against the terminal stud 13 after the stud is inserted. A second nut 21 is employed in order to receive a wire between the two nuts and thus make contact with the terminal.

The interior of each steel cup is filled with a plastic gasket material 22 having high insulating properties and considerable flexibility. It is constituted preferably of an organic silicon compound such as is sold on the market as "Silicone" and "Silastic". Compounds of this kind are characterized by a high degree of adherence to metal surfaces and extreme resilience, when baked, similar to rubber. Moreover, the compounds are strictly impermeable to air, water or electricity. The terminal is first inserted to the proper length into the cup and the washer 19 is applied, also the thumb nut 20. The space between the interior of the cup and the terminal is then filled with the compound, leaving an excess such that when the cup is pressed against the base 2 and the terminal presented to the opening in the base, preparatory to welding the flange 15 to the base, some of the compound will be forced into the annular space between the terminal and the flat portion of the steel cup. The washer 18 and the nut 17 can then be applied in order to hold the cup tightly against the base.

An electric or gas weld as indicated at 23 can then be laid down on the periphery of the flange 15 while holding the cup pressed against the base. This flange is sufficiently wide that the heat of the welding torch or arc will not be conducted to any great extent to the rubbery mass within the cup or to the washers 18, 19. Thus substantially the entire heat treatment of this mass is left to the baking process which follows after the welding operation and an exact control of the high temperature treatment can thereby be obtained.

On conclusion of this treatment which serves to cure the rubbery mass, the case is ready to receive the instrument movement. The terminals 13 are inserted through the openings 12 in the plate 10 and the nuts 16 applied. The movement 4 is thereby resiliently held within the casing by the joint action of the washers 18, 19 and the rubbery mass 22, all of which serve to insulate the terminal post from the case. Due to the high resilience of the compound, the instrument movement can withstand severe vibration and yet the joint between each terminal and the surrounding mass remains hermetically sealed because the latter tends to flow and intimately contact, when in plastic form, the threaded grooves of the terminal. This adherence is maintained during the baking operation and subsequent use of the device.

Inasmuch as the rubbery mass 22 completely fills the cup 14 and any crevices or opening between the cup and the base, and further, since this material does not shrink to any appreciable extent during the baking process but tends rather to expand slightly, there is no relative movement between the rubbery mass and the terminal or case in the cold state. There is therefore no cold flow of the mass in any direction and thus all parts thereof remain intact.

After the movement 4 has been resiliently mounted in the manner described, the next step in the manufacture of the instrument is to apply a glass window 24. In accordance with another feature of my invention, this element is also resiliently mounted in such a way as to be completely hermetically sealed and immune to moisture and leakage and at the same time is mounted so resiliently as to withstand severe shocks without fracture. A support ring or bracket 25 of steel is provided, this bracket having an inwardly extending flared or shouldered portion 26 to leave an annular space between that portion and the interior surface of the case. The outermost portion of the ring indicated at 27 has an external diameter such as snugly to fit inside the case to which it can be welded or otherwise secured prior to the application of the steel cups 14.

A gasket 28 of "Silicone" or "Silastic" or other suitable rubbery compound, pre-formed and baked or cured to a ring shape, may be inserted in the annular space provided by the cylindrical bracket. The gasket should fit fairly snugly within this space and should also have a height somewhat greater than the depth of the shoulder 26 so as to permit the plate glass window 24 to rest thereon. The window is made of smaller diameter than the case and is held in proper diametral position by means of a ring 29 of the same material as the element 28, or any other suitable flexible rubbery material. This ring is formed with a recessed surface indicated at 30, which when pressed against the gasket 28, completely fills the space between the edge of the window and the interior surface of the case.

The pressure on the gasket 29 is applied conveniently by means of a bezel 30 made of steel or other suitable material, the bezel being formed with a curvilinear hump indicated at 31 to fit over the gasket 29. The bezel is also provided with a flat surface 32 where it extends over the flange 3 and is of sufficient diametral size as to be bent around the flange and eventually crimped or otherwise secured to the under surface of the flange.

It will be noted that the upper flat portion 32 of the bezel is spaced a trifle from the flange 3, this spacing being indicated at 33, to assure a clamping effect to be exercised on the gasket when the lower surface of the bezel is crimped around the flange 3. Moreover, the outermost diameter of the bezel 30 is such as to leave a slight space about the outer diameter of the flange 3 in order that there will be no undue friction between the bezel and the flange when the bezel is being secured to the under-side surface of the flange. The bezel therefore has a free movement downward during the crimping operation and pressure can be resiliently exercised against the gasket 29 by the curved portion 31 of the bezel. The joint between the gaskets 28, 29 and the interposed window 24 is hermetically tight and also strictly moisture proof. It is apparent that the window is supported entirely within a rubber matrix about its outer edge and can therefore withstand vibration or other mechanical shocks.

While I have described the cups 14 as being made of steel in order to lend themselves to a welding or brazing operation as indicated at 23, these cups could be made of insulating material, such as ceramic, and secured to the case by any suitable and well known sealing compound.

Figures 3, 4:
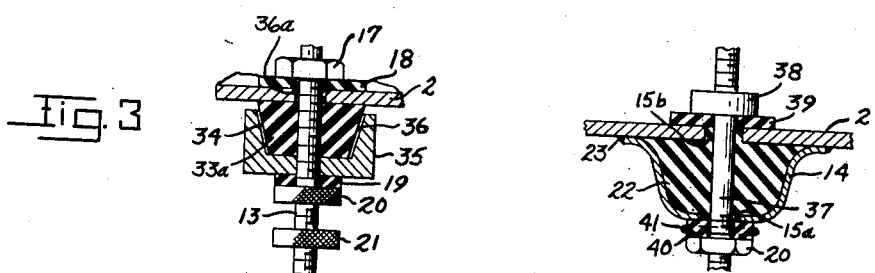
Figure 3 is a fragmentary sectional view of a modified form of the terminal seal.
Figure 4 is also a fragmentary sectional view of still another form of the improved terminal seal.

In Figure 3 there is shown a modified form of the improved terminal seal. In this figure, the same reference characters designate corresponding elements as in Figure 1. In this case, a pre-formed gasket 33a is employed having a tapered surface indicated at 34, and a central opening which snugly receives the terminal post 13. A ring 36a of rubber or other flexible insulating material can be inserted between the plate 2 and the stud 13. The gasket 33a may be made of any rubbery material, but I prefer to employ an organic silicon compound such as "Silicone" or "Silastic" mentioned hereinbefore, but in a baked relatively solid state. Other forms of rubbery material, natural or artificial, such as pre-formed neoprene, may also be employed as long as the substance does not flow when in a cold state.

There is a fairly thick nut 35 surrounding the gasket 33a, this nut being threaded onto the stud 13 and having a tapered cylindrical recess indicated at 36 of approximately the same degree of taper as the gasket. It is apparent that as the nut 35 is turned in the tightening direction toward the base 2, pressure is exerted on the rubbery gasket 33a and the interior of the nut 35 is completely filled so as to press the material against the threads of the stud. Thus a strictly hermetic, resilient and moisture proof seal is obtained in this manner. It is obvious that the gasket 33a should be sufficiently thick that when the nut 35 is tightened to its final position, an insulating space will still be left between the base 2 and the upper edge of the nut. None of the gasket material will be forced into this space because the material does not cold flow. The washer 19 and the two thumb nuts 20, 21 can then be applied to the terminal in order to make contact with external circuits.

Still another modification of the terminal seal is shown in Figure 4. The steel cup 14 is filled with any suitable organic compound such as "Silicone" or "Silastic," and the steel cup is then welded or brazed as indicated at 23 to the base 2 of the case. In case the base 2 constitutes the Bakelite panel of an instrument, any suitable and well known sealing compound can be used to affix the steel cup to the base or panel. A terminal post 37 is inserted through the opening 15b in the base or panel and through the compound 22. This terminal is provided with a collar or shoulder 38 and there is a rubber washer 39 inserted between the collar and base in order completely to close the opening 15b. The upper end of the terminal is threaded to receive the nut 16 which holds the plate or base member 10 of the instrument movement in position. It will be understood that the collar 38 takes the place of the nut 17 which is shown in Figure 1. The terminal post is threaded only at the upper and lower ends since the collar would normally be turned on a lathe and there is no purpose for threads at the intermediate portion of the rod.

At the lower end of the cup 14, a ceramic insulating washer 40 is applied over the terminal, and has a grooved periphery which receives a rubber or neoprene ring 41.

The purpose of this washer is to insulate the terminal from the steel cup 14. Directly below this washer there is a nut 20 which serves to press the insulator against the steel cup. A second nut 21 for binding a connecting wire may also be employed. The compound 22 is baked and rendered rubber-like after the terminal 38 has been pressed through the opening 15b of the base as far as the shoulder 38, so that this shoulder, the washer 39, the base and the cup welded thereto are all in place during the baking operation. The washer 40 and the nut 20 can be applied to the terminal either before or after the curing treatment.

As in the case of the structure shown in Figure 1, the organic silicon compound when heat-treated tends to tenaciously adhere to the terminal 37 so as to leave no air space and this gripping action is increased by the clamping effect of the nut 20 which presses down through the solid ceramic insulator 40 against the flat portion of the cup 14 to cause a compressing effect. After the baking operation, there is absolutely no cold flow of the rubbery material since the cup 14 is completely filled with the material and there is no leakage whatsoever at any of the openings 15a, 15b. The rubber ring 41 serves to break up the ionization path over the surface of the ceramic element 40 after long exposure to high humidity, thereby preventing any breakdown of the insulating properties of the ceramic material.

As in the case of the structure shown in Figures 1 and 3, the insulating bushing described in connection with Figure 4 provides a resilient mounting for the plate 10 so that the instrument as a whole can be subjected to intense vibration without deleteriously affecting the movement 4. The terminal support or bushing prevents any entrance of air, gas or moisture to the interior of the case, even when the latter is subjected to intense vibration. The rubbery parts of the bushing remain in position and there is no tendency for cold flow in any direction because the steel cup 14 has been completely filled with the flexible gasket material.

While I have described my improved terminal bushings in Figures 1, 3 and 4 as extending exteriorly from the case 1, it is obvious that they are equally effective when, for any operational reason, it is necessary to extend them into the interior of the case, i. e. to reverse the bushing, end for end. Suitable changes in the method of installing the bushings, in this case, would be provided.

It will be further understood that the bushings have utility in other devices than instrument cases and can be used in any electrical structure where minimum leakage is necessary between a terminal post or other conductor and a surrounding metal body or plate, particularly in case extreme flexibility of a combined terminal and support post is also a prerequisite.

It will be understood that various modifications and arrangements in structure could be made without departing from the spirit of my invention and, accordingly, I desire to comprehend such modifications and substitutions of equivalents as may be considered to come within the scope of the appended claims.

Having thus fully set forth and described my invention, what I claim as new and desire to secure by Letters Patent is:

1. In combination, a terminal structure and a cooperating plate forming part of an instrument casing, an opening in said plate, said structure comprising a threaded stud which passes through said opening, said opening being of larger size than the stud to leave a space therebetween, a resilient mass surrounding the stud and extending into said space as far as the edge of said opening, an apertured cup-shaped member having the apertured end adapted to be pressed inwardly and containing said mass, said member secured to said plate at the position of said opening, an abutment on said stud at one side of the plate and means on said stud at the other side of the plate for pressing the apertured end of the cup-shaped member inwardly.

2. In combination, a terminal structure and a cooperating plate forming part of an instrument casing, an opening in said plate, said structure comprising a threaded stud which passes through the opening, said opening being of larger size than the stud to leave a space, a mass of resilient material surrounding the stud extending into said space as far as the edge of said opening, a thin-walled cup-shaped member having an apertured end adapted to be pressed inwardly for holding said material in position and for pressing said material against said stud, said member being secured to said plate and said aperture being in alignment with said first-mentioned opening through which the stud extends, the size of the last-mentioned opening being larger than the stud to leave a space therebetween, said mass of material extending into the last-mentioned space, an abutment on said stud at one side of the plate, and a nut on said stud bearing against the cup-shaped member at the other side of said plate for pressing the apertured end of the cup-shaped member inwardly.

References Cited in the file of this patent

UNITED STATES PATENTS

| | | |
|---|---|---|
| 921,018 | Soule | May 11, 1909 |
| 1,817,355 | Elliott | Aug. 4, 1931 |
| 2,155,270 | Johnson | Apr. 18, 1939 |
| 2,215,570 | Sylvander | Sept. 24, 1940 |
| 2,346,483 | Goss | Apr. 11, 1944 |
| 2,356,831 | De Monte et al. | Aug. 29, 1944 |
| 2,367,449 | Triplett | Jan. 16, 1945 |
| 2,374,084 | Dubilier | Apr. 17, 1945 |
| 2,382,970 | Borcherdt | Aug. 21, 1945 |
| 2,397,975 | Obemaier | Apr. 9, 1946 |
| 2,406,852 | Relf | Sept. 3, 1946 |
| 2,425,404 | Touborg | Aug. 12, 1947 |
| 2,426,800 | Triplett | Sept. 2, 1947 |
| 2,433,911 | Johnston | Jan. 6, 1948 |
| 2,438,572 | McCormack | Mar. 30, 1948 |
| 2,456,246 | Berg et al. | Dec. 14, 1948 |
| 2,550,112 | Fields | Apr. 24, 1951 |
| 2,678,346 | Garraway | May 11, 1954 |